United States Patent Office 3,343,286
Patented Sept. 26, 1967

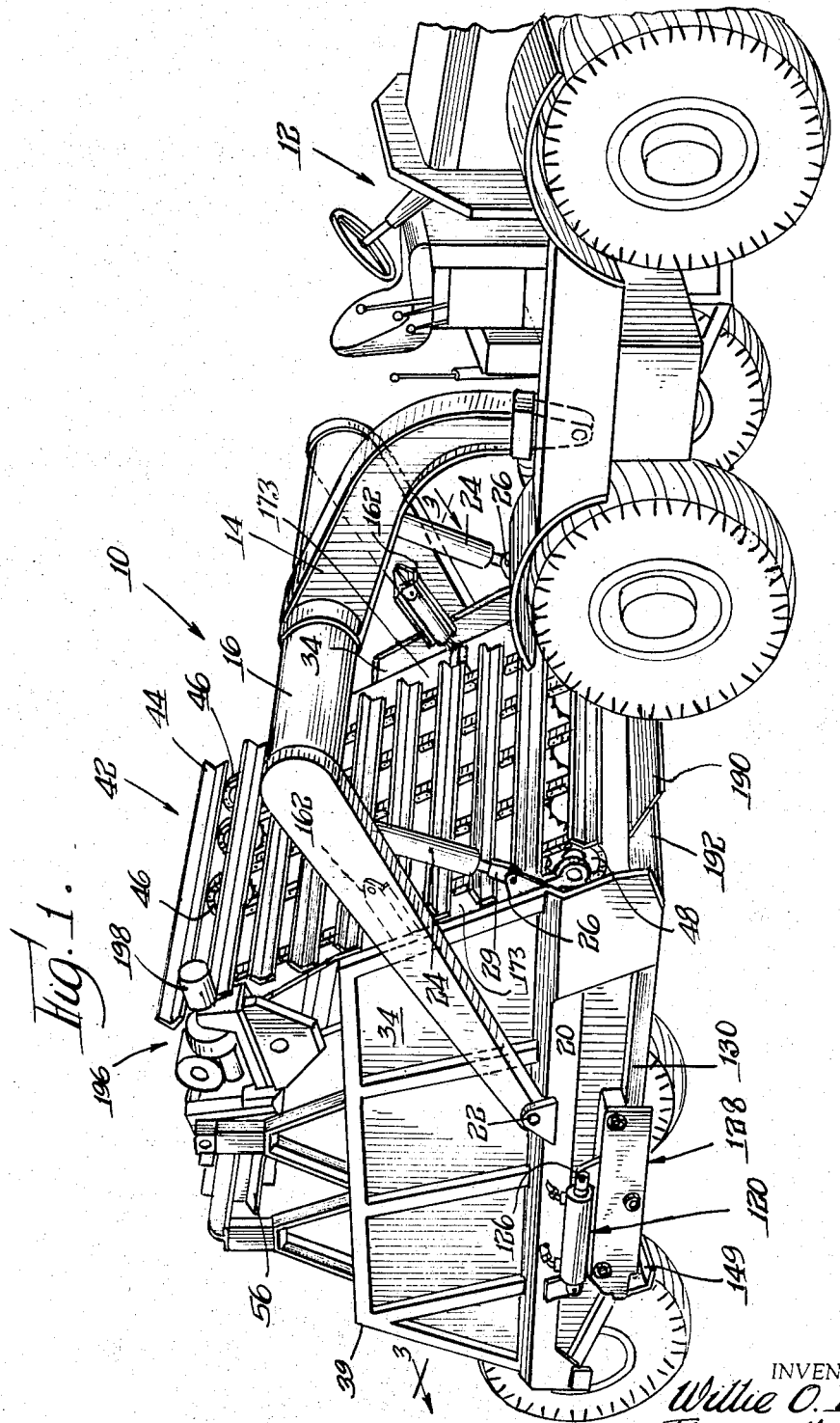

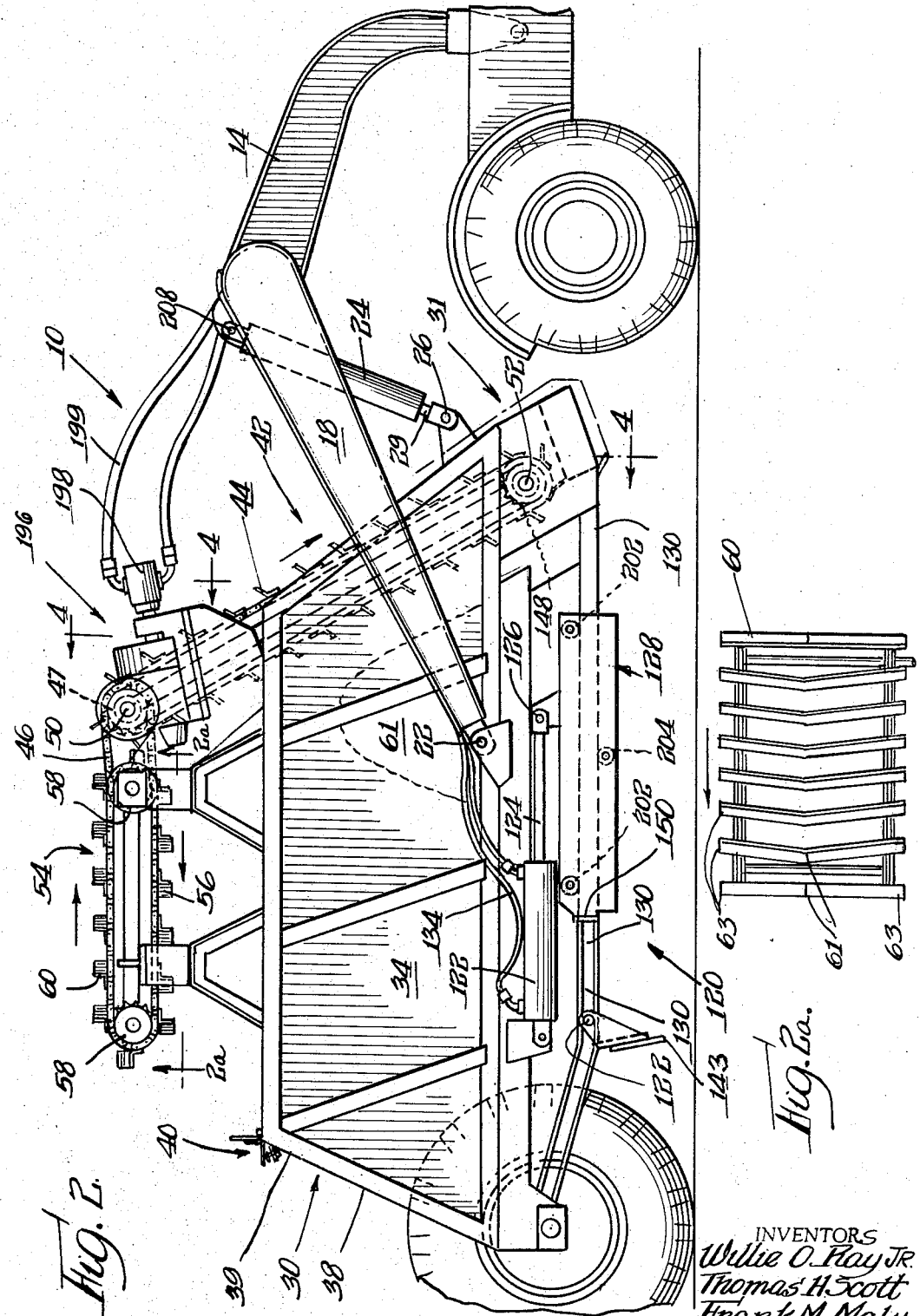

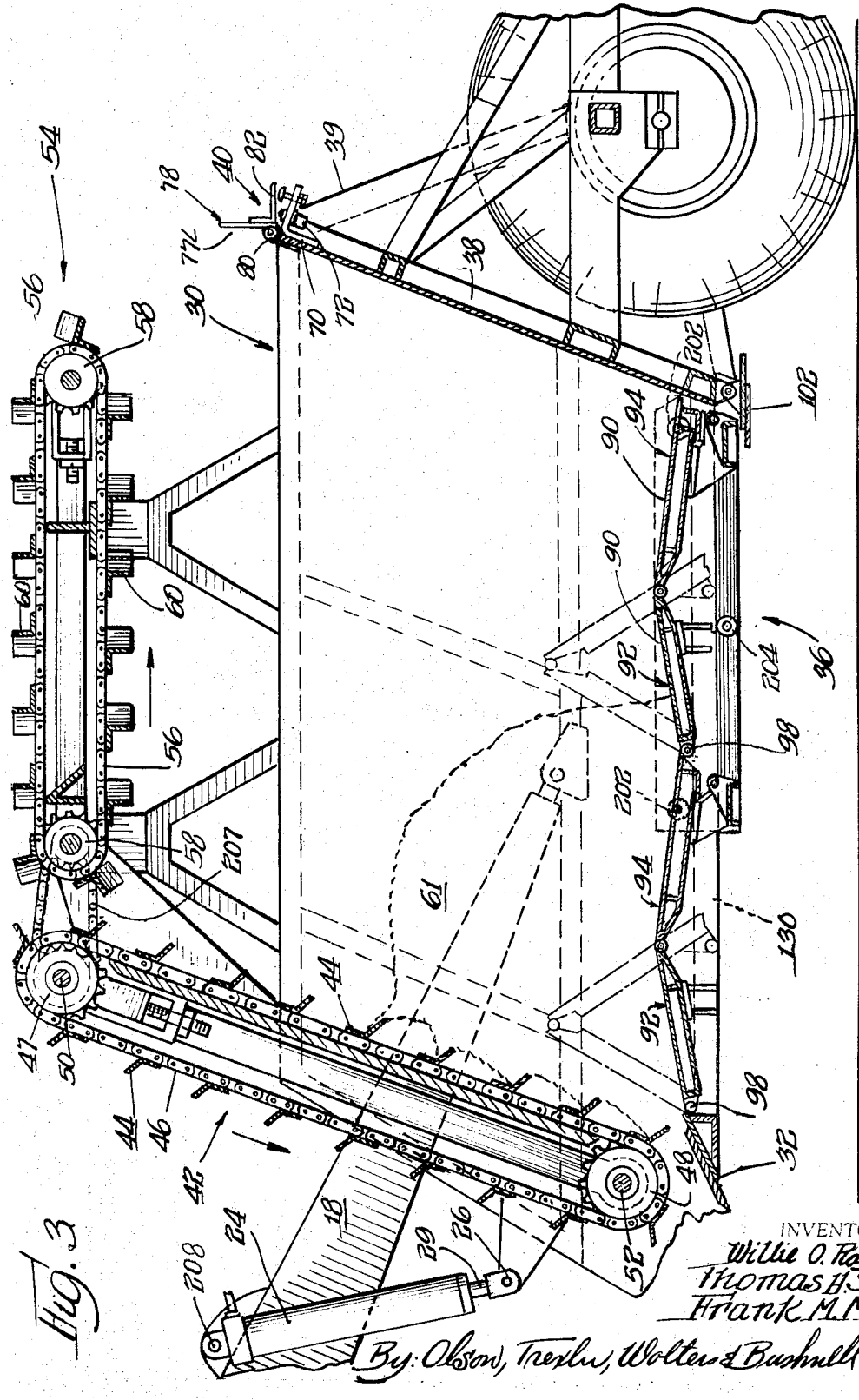

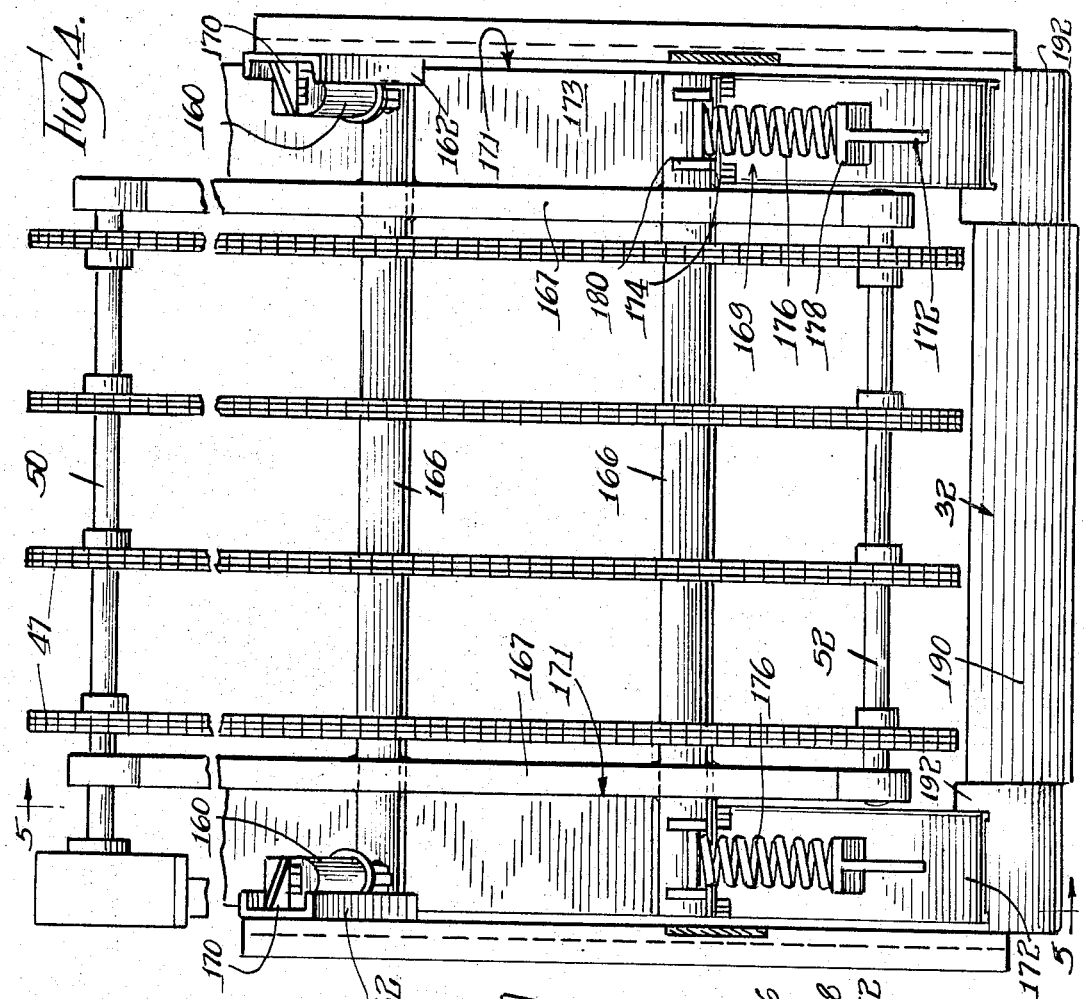
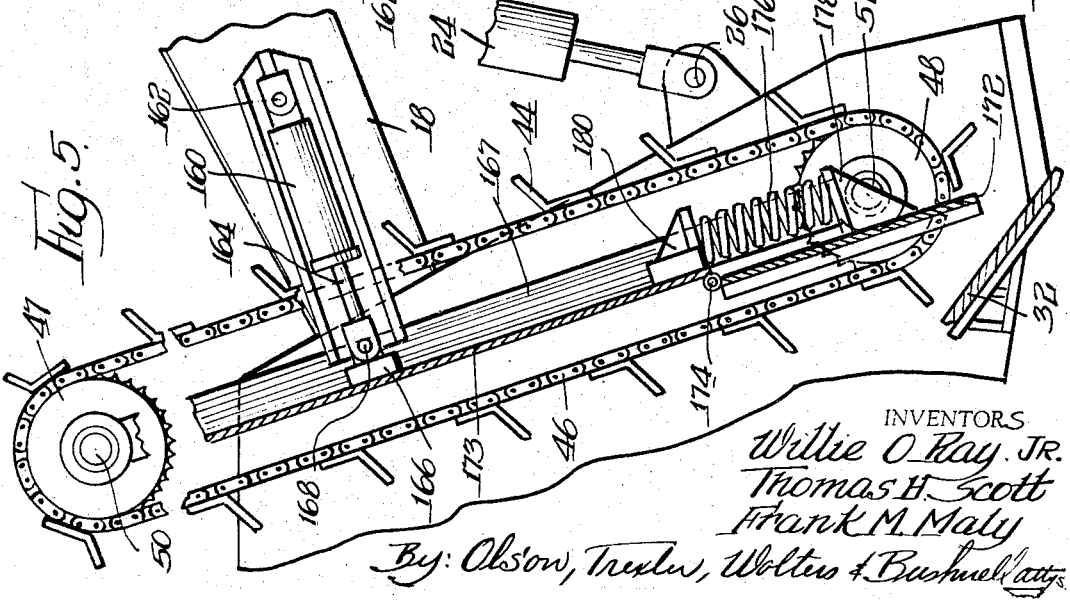

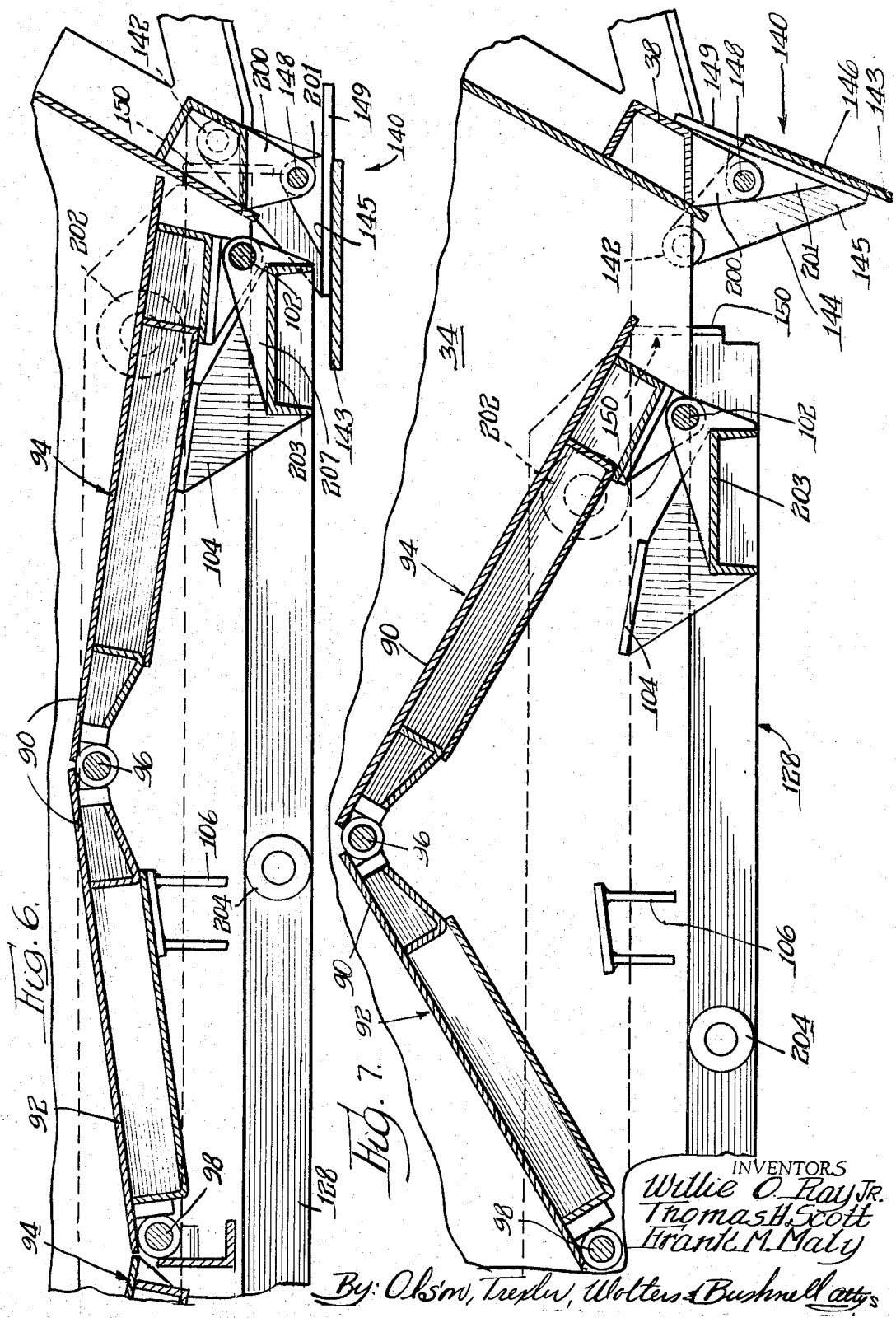

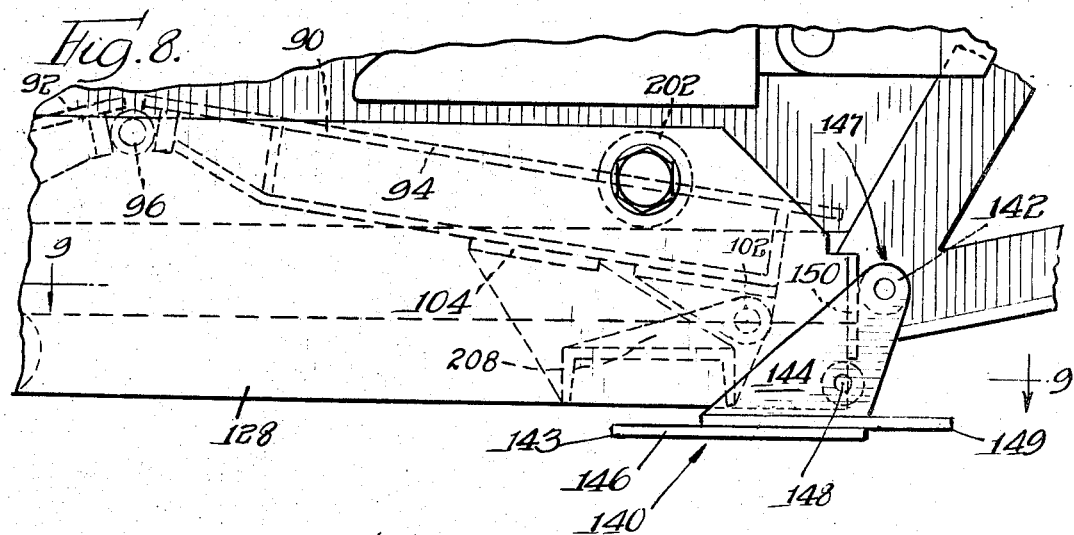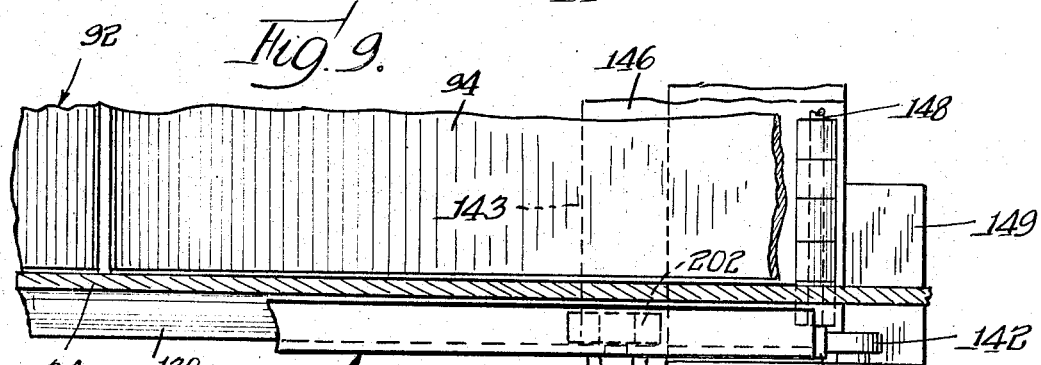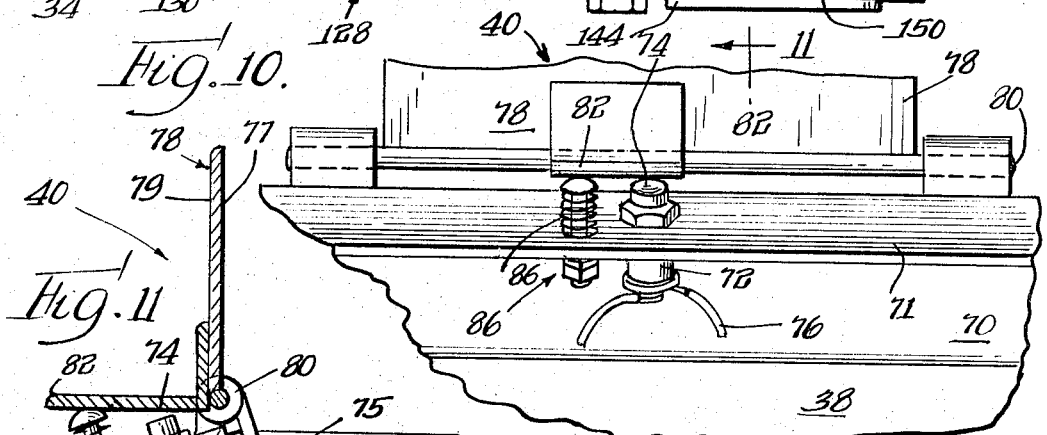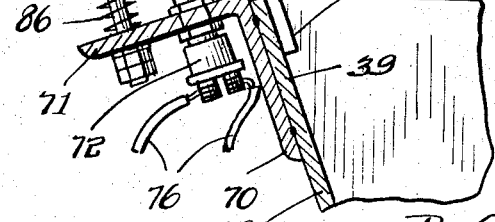

3,343,286
ELEVATOR SCRAPER
Willie Odgen Ray, Jr., and Thomas Harrison Scott, Jackson, Miss., and Frank M. Maly, Chicago, Ill., assignors to M-R-S Manufacturing Company, Jackson, Miss., a corporation of Delaware
Filed May 6, 1964, Ser. No. 365,416
39 Claims. (Cl. 37—8)

This invention relates to earth moving scraper machines and more particularly to improvements in the construction and operation of an elevator scraper of the front loading, bottom dumping type to the end that earth scraping, loading and spreading is facilitated.

Thus a general object of this invention is to improve the construction and operation of an elevator scraper to facilitate scraping, loading and spreading of earth fill materials, cullet, spoil, garbage, sand, gravel or the like.

Conventional scrapers

In conventional earth scraper machines, a scraper bowl is provided into which earth fill materials are loaded. A forward end of the scraper machine has a scraper blade decliningly mounted thereon. When it is desired to load the scraper bowl, the front end of the machine is lowered so that the blade contacts the ground; and the scraper machine is moved forward by a tractor or other towing means. As the scraper moves forward, the blade cuts into the earth and earth fill materials are scraped into the bowl.

The front of the scraper bowl may be open with a bowl apron which is conventionally lowered over the front end after the bowl is loaded to close the bowl and retain the earth fill materials therein. When it is desired to eject the earth fill materials from the bowl, the bowl may be tilted forward at a relatively high angle of elevation and the apron is raised to permit dumping.

A scraper machine with provision for bottom dumping is desirable since the tilting mechanism required to tilt a bowl, before dumping, as above, has been costly, unstable, and unwieldy. Other prior art means of unloading included drop-down scraper bowl sides, pusher plate, forward ejection of the earth fill and miscellaneous means for dropping the floor of the scraper bowl.

None of these earth ejection means have been satisfactory because of various objectionable features such as an excessively large scraper body, intricate and costly provisions for unloading, loss of valuable scraper bowl space required for ejection mechanism, excessive material handling costs due to manual ejection, a generally unwieldy and unstable scraper machine and generally unacceptable unloading means.

Objects of the invention

Bottom unloading, while recognized as desirable because of greater reliance on the natural forces of gravity in dumping, has not been acceptably achieved in the prior art because of the difficulties experienced in raising the weight of earth carried by the floor in raising the floor and even greater difficulties experienced in the gradual dropping of the floor, that is, without causing binding of the scraper bottom on the large pile of earth dumped.

Thus an important object of the present invention is to provide means for bottom unloading of a scraper whereby the earth is uniformly and controllably unloaded.

Another object is to provide means for raising the floor of the scraper so that earth fill materials within the scraper bowl may be gradually deposited and in the place desired.

Another object is to provide a means of unloading the scraper bowl selectively, that is, without dumping all of the earth fill materials in one place.

Another object is to provide auxiliary unloading means whereby the earth fill materials are gradually vibrated and sifted from the bottom of the scraper bowl.

Another object is to provide selective positioning earth fill dumping means so as to slowly dump the materials in the scraper bowl with means for achieving acceleration of the dumping process as desired.

Another object is to provide means for quickly and easily unloading the earth fill without binding of the scraper machine on the materials unloaded.

A more specific object is to provide a simple floor raising mechanism which is capable of raising relatively great loads of earth fill materials without the need for bulky or expensive auxiliary power equipment which is not readily available.

A further object of the invention is to provide novel elevator means for hastening the process of loading the scraper bowl.

Another object is to provide a simplified elevator capable of quickly loading great quantities of earth fill materials coacting with conventional scraper blade means to achieve loading without undesirable binding of the scraper bowl on the ground.

Still another object is to provide a substantially vertical earth fill elevating device whereby relatively low power requirements are necessitated to load the scraped earth into the scraper body.

Still a more specific object is to provide a narrow elevating device having means for assisting in the selective unloading and selective positioning of a load of earth fill.

Another object is to provide an elevator device which is capable of loading large rocks, stumps and other larger objects without undue interference with the normal loading operation.

Another object is to provide novel signal means coacting with a unique horizontal conveyer to notify the scraper operator that the bowl is completely loaded.

Another general object is to provide improved bottom dumping means whereby the load of dirt is more readily dumped.

Another object is to provide improved spreading means whereby the unloading operation is more readily and more uniformly accomplished and the load is spread uniformly over the area desired.

Another object is to provide automatic rock bypass means whereby larger objects such as rocks, roots and heavy solid clots of earth may be readily loaded without interference with the loading operation.

These and other objects of the invention will appear in the following description of the invention taken in conjunction with the appended claims and drawings, in which:

FIG. 1 is a perspective view of a scraper machine constructed in accordance with the invention and illustrated as being towed by a tractor;

FIG. 2 is a side elevation view of the scraper shown in FIG. 1 more clearly illustrating the novel elevator device of the invention;

FIG. 2a is a reduced scale fragmentary section view of the horizontal conveyer shown in FIG. 2 taken along the section lines 2a—2a of FIG. 2 showing the V-shaped longitudinal configuration of the conveyer slats;

FIG. 3 is an enlarged sectional elevation view taken along section lines 3—3 of FIG. 1, revealing the novel elevator and conveyer devices and the novel floor of the scraper of FIG. 1;

FIG. 4 is a front elevation view of the scraper in FIG. 1, showing the spring loaded support means for a vertical elevator;

FIG. 5 is a fragmentary section view of the vertical elevator of the invention taken along the section lines 5—5 of FIG. 4, showing the spring support means for the vertical elevator and also showing the lateral material retainer means of the invention;

FIGS. 6 and 7 are fragmentary side elevation views of the bottom doors of the scraper bowl of FIG. 3, the doors being shown in FIG. 7 in a partially raised position in comparison to the closed position shown in FIG. 6;

FIG. 8 is a fragmentary side elevation view of a rear portion of the scraper shown in FIG. 6 with a bottom door of my invention shown in dotted lines to more clearly reveal novel earth spreader means actuated by bottom door raising means;

FIG. 9 is a section view taken with reference to the line 9—9 of FIG. 8 showing the spreader mechanism of FIG. 8;

FIG. 10 is a fragmentary section view on an enlarged scale of a novel signal device positioned at the upper rear corner of the scraper bowl of FIG. 3 taken along the section lines 10—10 of FIG. 3;

FIG. 11 is a side elevation view of the signal device shown in FIG. 10 taken along the section lines 11—11 of FIG. 10.

The scraper in general

The present invention may now be better understood by referring in greater detail to the drawings. FIGS. 1 and 2 show an earth scraper or vehicle 10 constructed in accordance with the teachings of this invention and attached to a panel-controlled power source 12 towing the scraper and powering the various improvements provided in the scraper machine of this invention.

The scraper machine 10 includes a yoke frame 14 having a cross member 16 and laterally spaced side arms 18 pivotally secured to the scraper support frame 20 by pins 22.

The yoke 14 is seen to have secured thereto a pair of power cylinders 24 pivotally connected to the upper portion of side arms 18 by the pin 208, as clearly shown in FIG. 3.

The power cylinders 24 each have a piston arm 29 which arms are pivotally connected to the scraper frame 20 by pins 26. On actuation of the power cylinder, the piston arm is extended dwonwardly and pushes a scraper blade 32 downwardly into ground engaging, bowl filling position.

FIGS. 1 and 2 also show a hydraulic engine 198 shown in gear-driving relationship within a gear box 196. The engine 198 being the moving force for a material handling assembly comprising a horizontal section or conveyer and a vertical elevator, conventional hydraulic hoses 199 shown leading to the hydraulic engine.

The scraper machine has a bowl or body or receptacle portion 30 having a pair of sides 34, and a bottom or basewall or floor 36 attached pivotally to the lower parts of the sides 34. The front or forward end portion of the bowl is open and the scraper blade 32 is attached to the front end of the bottom 36 at a forward declination to the bottom. The rear portion of the bowl is closed by an end 38 in FIG. 2 attached rigidly to the sides with a signal device 40 mounted on the upper portion 39 of the end.

An advantageous provision of the invention is the manner in which the cutting edge of the scraper blade is restricted laterally to cheater bit or cutting edge 190 extending over only about one-half of the total width of the scraper blade 32. This is well illustrated in FIGS. 1 and 4 showing the manner in which the scraper blade 32 has a forwardly extending cheater bit 190 and two end bits 192.

In one commerical embodiment of the invention illustrated in FIG. 1, a scraper bowl is provided having an inner width between sides 34 of approximately 120 inches; the cheater bit 190 extends over only about 66 inches or approximately 55 percent of the scraper bowl width. Contrary to expectations, it has been found that such reduction in width of the leading edge of the cutter blade permits a better, that is, a cleaner cutting action on the earth fill material to be loaded into the bowl permitting easier and faster loading of the bowl.

The vertical elevator

An upwardly extending elevator 42 illustrated in FIGS. 1–5, while positioned at a slight angle from the vertical plane, will be referred to hereafter as the "vertical elevator." The vertical elevator 42 comprises spaced apart horizontally positioned obtusely V-angled material engaging slats or angle irons 44 positioned upon upwardly extending continuous chains 46 mounted on upper and lower sprockets 47 and 48 respectively. The sprockets 47, 48 are conventionally mounted on upper and lower shafts 50 and 52, with the shafts being conventionally rotatably driven by tractor control means to push material upwardly away from the blade 32 when loading the bowl or body 30.

It has been found advantageous to provide elevator conveyer slats which do not extend completely across the conveyer bowl but are rather confined to about the same width as that of the scraper cheater bit 190. This relatively smaller width of the cheater bit and the vertical elevator slats has been found to permit about the same amount of material to be urged or pushed into the scraper bowl over a certain period of time as would be achieved with wider slats, that is, a high rate of earth pickup is maintained but with considerably less power required to lift the earth fill materials into the bowl by reason of the relatively narrower slats.

In the loading operation, the slats 44 move downwardly on the front of the sprockets and correspondingly upwardly on the back of the sprockets as indicated by the arrows in FIGS. 2, 3. While elevators have been provided on conventional scraper devices, prior art elevators have been relatively ineffective because of the necessity for positioning them to extend as far back into the scraper bowl as possible, that is, rearwardly at an angle of 45 degrees or less with a horizontal plane. With the improved elevator means of the present invention, it has been found possible to load considerably more material into the scraper bowl and to more completely fill the bowl by providing a substantially vertical elevator, that is, an elevator positioned at an angle of 60 degrees or substantially more from the horizontal plane.

In the particular commercial embodiment illustrated in FIG. 1, the vertical elevator slats are shown narrower than the width of the bowl extending toward the sides of the scraper bowl about 10 inches more than the cheater bit, that is, each slat being approximately 86 inches in width.

As the scraper device is pulled forward by the tractor or other tow means, the scraper blade is lowered and the forward movement of the scraper device tends to force earth fill cut by the scraper blade into the scraper bowl. The vertical elevator is actuated by the operator to rotate clockwise in the direction of the arrows shown in FIG. 2 as soon as the scraper blade is brought into contact with the ground. Because of the fact that the vertical elevator slats do not extend very far back into the scraper bowl, a pile of earth is soon formed in the bowl near the vertical conveyer.

As seen clearly in FIG. 3, a dirt pile 61 forms near the front of the scraper bowl and thus the vertical elevator operates on a relatively light amount of earth fill materials which are brought in by the scraper blade. The cross sectional configuration of the slats on the vertical conveyer are advantageously of an obtuse angle, rather than as conventional slats having an acute or a right angle cross sectional configuration. Because of the obtuse angulation of the slats, the earth fill upon approaching a point adjacent the top of the pile 61 slides off the conveyer slats gravitationally, the fill previously positioned on the pile effectively preventing the most recently scraped earth fill materials brought in on the slats from being deposited on the pile. As the pile of earth continues to rise, it begins to fall toward the rear of the scraper bowl partially of its own volition.

Rock bypass provision

Advantageously and in compliance with another important objective of the invention, a rock bypass mechanism is tied into the vertical elevator mechanism. This rock bypass mechanism may be seen in FIGS. 4 and 5, FIG. 5 showing the vertical elevator, the bypass mechanism and another important feature which will be hereafter described, a flexible material retaining device provided laterally and near the bottom end of the vertical elevator. The rock bypass mechanism includes an elevator positioning assembly comprising a hydraulic cylinder and piston arrangement 160 positioned along its periphery within a cylinder bracket 162, secured to an inner portion of the bowl sides, a piston arm 164 being pivotally connected at its one end to a horizontal extension plate 166, which is a cross member of the elevator frame 167, by pins 168. The other end of the cylinder is secured to the scraper bowl side at 170.

The manner in which the hydraulic cylinder and piston arrangement 160 is secured to the horizontal extension plates 166 which are horizontal extensions or cross members of the vertical elevator frame 167 projecting outwardly to mount the cylinder and piston arrangement 160 is apparent in FIG. 4. The hydraulic cylinders hold the bottom portion of the vertical conveyer downwardly in the position shown in FIG. 5 which shows the piston arms in extended position holding the conveyer bottom in position with sufficient room between the conveyer slats and the scraper blade so that earth fill materials may enter between the blade and the conveyer, the conveyer slats assisting the earth fill materials into the scraper bowl.

Thus, hydraulic pressure holds the elevator down in normal earth lifting position. To prevent rocks or other large objects jamming between the blade and the elevator slats as is frequently a problem in prior art elevator scraper devices, the elevator is enabled to move pivotally upwardly about a horizontal axis of the upper shaft 50.

In the event that a rock begins to wedge itself between the blade and the elevator, the wedging force of the rock, builds up a pressure tending to force the elevator and blade apart. When the wedging pressure exceeds the hydraulic pressure within the hydraulic cylinder, the wedging pressure overcomes the cylinder pressure and the elevator is moved upwardly relative to the blade 32 to a rock or material bypass position, as before described. When the rock passes on between the blade and the elevator into the bowl, the pressure still maintained within the cylinders forces the elevator back down into its normal loading position.

While the use of a hydraulic cylinder is preferred, it has been found that an air cylinder tied into an accumulator or air chamber maintaining a constant air pressure within the cylinder also performs in an acceptable manner to hold the elevator down in normal loading position.

Horizontal conveyor

A horizontal rearwardly extending upper conveyor 54 is provided and includes rearwardly extending, generally horizontally positioned continuous chains 56 mounted upon upper forward and rear sprockets 58 with horizontally extending spaced apart, longitudinally V-shaped material engaging angle irons or slats 60 mounted upon the chains. The longitudinally V-shaped configuration of the slats 60 is clearly revealed in FIG. 2a illustrating slats on the sprocket undersides having leading central portions comprising a vertex 61 and trailing end portions 63.

The angle irons on the under side of the conveyor 54 have their leading material engaging portions positioned nearer or facing the rear end of the scraper body than the trailing end portions. The angle irons in normal operation move horizontally rearwardly in the direction of the arrows and sweep or push earth fill material to the sides and rear of the scraper bowl as it accumulates within the bowl.

As before noted, the vertical elevator is substantially upright and cooperates with the scraper blade to load earth fill materials in the bowl. A pile of earth fill materials rises rearwardly adjacent the elevator, and as additional earth fill material is scraped, it is elevated to the top of the previously accumulated earth fill, the obtuse configuration of the elevator slats uniquely permitting earth fill materials to slip downwardly on the pile before the uppermost portion of the earth fill pile is reached.

Finally as the pile of dirt continues to mount upwardly, it approaches the slats of the horizontal conveyor moving in the direction of the arrows. When the pile reaches the conveyor height, the horizontal conveyor slats take over to continuously push over the apex of the pile of earth 61 so that the earth begins to fill the rear end portion of the scraper bowl.

By reliance to a great degree on natural forces, that is, forces of gravity causing the earth to fall downwardly, filling the scraper bowl, rather than relying on conventional elevator methods of pushing the earth to the rear of the scraper bowl which cannot be completely filled, savings of power, time and space are achieved.

By the cooperative action of the vertical elevator and the horizontal conveyor, that is, the elevator sweeping or pushing scraped earth fill materials upwardly and the conveyor sweeping or pushing the materials sidewardly and rearwardly, a more complete rearward loading of the scraper is achieved than in prior art scraper machines, and this at a minimum of time and expense. Because of the more complete rearward loading, scraper machines in accordance with the invention are permissively longer with resultant greater stability than the relatively wide and short scraper bowls common to the prior art.

An important advantage accruing from the cooperative arrangement between the vertical elevator and the horizontal elevator, besides resulting in a more complete loading of the scraper, results from the manner in which earth fill materials are dropped into the scraper bowl rather than being forced into the bowl; that is, the materials are not compacted. As would be expected, the materials may be unloaded more readily than if the materials were compacted into large clots and lumps of earth. Further, the scraper blade arrangement in combination with the slats of the vertical elevator has been found to pulverize the material as it is loaded. This is especially advantageous since an additional pulverizing operation is not required before unloading.

Another advantageous feature of the invention is the provision of reversibility on the vertical elevator and on the horizontal conveyor. The reversible feature is of great value in the unloading and spreading operation, for the hydraulic pressure on the hydraulic cylinder and piston arrangement 160 is releasable, permitting the bottom end of the vertical conveyor to swing upwardly and permitting some of the earth fill materials within the scraper bowl to fall gravitationally in the area between the scraper blade and the bottom end of the vertical conveyor. At the same time, the vertical elevator may be started in reverse with the result that dirt is positively displaced through the opening provided between the scraper blade and the vertical elevator.

At this point, the novel shape of the vertical elevator slats is again seen to be advantageous in that in addition to the earth fill materials being directed downwardly and forwardly about the scraper bowl, the unique elevator slats urge the earth fill materials downwardly and rearwardly through open bottom dump gates. Such reverse movement of the vertical conveyor results in a substantial acceleration of the dumping operation.

The operation of the horizontal conveyor is also reversed in the normal unloading operation where the unique longitudinal V-shaped configuration of the slats gathers the earth fill materials to the center and tends to push them downwardly and out the bottom dump doors.

Conventional means for lowering the horizontal conveyor into position to encounter the materials within the bowl may be provided advantageously; and would be of considerable use especially where relatively larger scraper bowls are required.

In the event that earth fill materials stay in the bowl for a period of time and compact there, the compacted earth may be relatively more difficult to unload; and in conventional scrapers, the unloading process may have to be manually started. Vibrating means may be provided advantageously to obviate the need for manual labor assistance; and in the present invention such vibrating means are provided comprising the vertical elevator and horizontal conveyor.

The horizontal conveyer is driven by a continuous chain 207 mounted on an upper elevator sprocket 47 for rotation dependently of the vertical elevator, the horizontal conveyer thus being driven off the vertical elevator.

Repeat reversing operation of vertical elevator and the horizontal conveyer, that is, starting operation of the elevator and the conveyer driven off the elevator in reverse, switching to forward, and then to reverse again for as many times as required, serves to vibrate the load and accelerates unloading. In a more difficult case of earth packing, such repeat reversing of the elevator and conveyer usually is sufficient to start unloading of even severely packed earth.

A front apron is conventionally attached to the frame sides closing the front of the scraper bowl to hold material in the bowl after loading. In the present invention, a scraper apron is advantageously omitted, although rectangular retainer plates or panels 173 hereafter described may be used to partially close the front. The omission of an apron saves considerably in overall scraper weight and also saves in that a mechanism to open and close the apron is not required.

As before described, the cylinder and piston arrangement 160 and 162 attached to the conveyer frame and to the scraper bowl has its piston arm 164 partially extended and holding the bottom portion of the conveyer in position. At such time as completion of the loading operation is accomplished, the hydraulic cylinder may be actuated to extend the piston arm 164 and thus position the vertical elevator in travelling or material retaining position so that the bottom end of the conveyer is proximate to or in abutting engagement with the scraper blade, preventing any materials from falling between the opening between the scraper blade and the lower portion of the vertical conveyer. The scraper slats are thus positioned more firmly against the earth fill materials within the scraper bowl in earth retaining fashion so that when the scraper device is moved to a desired dumping location, the earth fill materials within the scraper bowl are retained therein by the elevator itself, without the necessity for an additional piece of equipment, that is, a front apron for the scraper bowl.

*Bottom dump doors*

Another highly advantageous feature of the present invention is a bottom dump or emptying provision. Bottom dumping has long been recognized to be a desirable feature of a scraper machine since additional costly dirt ejection means may be omitted. Unfortunately prior art scraper machines never acceptably achieved bottom dumping. In recent years manufacturers of scraper devices through necessity have gone to other means for ejecting the earth fill.

The unique bottom unloading means of this invention is pictorially described in FIGS. 2–3 and 6–9. The bottom unloading means comprises one or more sets of two upwardly opening bottom dump gates or doors 90, with one set of dump gates shown in FIG. 6 in closed position and in partially raised position in FIG. 7. In the embodiment of my invention shown in FIG. 3, the floor or base of the scraper bowl comprises two sets of doors or dump gates which move upwardly to dump the load of earth fill materials within the scraper bowl. Each door comprises two gates 90. It is apparent that additional doors may be provided as desired for larger scraper machines.

The two dump gates or panels 92 and 94 comprising one door are connected pivotally at their central ends by hinges or pins 96 extending transverse the sides, dump gate or panel 92 being fixedly, pivotally connected to the scraper frame by pin 98. Dump gate or panel 94 is supported pivotally and reciprocatingly by hinge pin 102 carried by lugs 207, 208 with lug 208 being mounted on transverse channel 203 which also carries dump gate support bracket 104.

The transverse channel 203 extends transverse the scraper bowl sides and is supported for movement reciprocatingly forwardly and rearwardly by two carriers 128 comprising door or gate opening mechanism. Carrier 128, best seen in FIGS. 1, 2, has upper and lower carrier rollers 202 and 204 respectively and is reciprocatingly mounted on a guide track 130 by means of upper carrier rollers 202 running along the top of track 130 and lower carrier rollers 204 below the track maintaining the carrier in position on the track 130 which is mounted outwardly of the scraper bowl sides, that is on the outer sides of the scraper bowl, extending generally horizontally. Forward movement of the carrier along the track causes the under portions of the dump gates 92 and 94 to move convergingly together, that is, the dump gate 94 and hinge pin 102 moves toward pin 98.

The upper face of the support bracket 104 is inclined upwardly toward the hinged connection 96 between the dump gates 92 and 94; thus, the support bracket 104 supports dump gate 94, when in its closed position, at a slight angle inclinedly upwardly from the horizontal plane, and keeps the doors from getting completely horizontal. It has been found this inclinedly upwardly position results in improved opening movement of the doors making it relatively easier to open them with considerably less power required. Another support bracket 106 is fixedly secured to the scraper frame and similarly supports dump gate 92 inclinedly upwardly toward the central door pin 96.

In order to transport the channel 203 and the support bracket 104 reciprocably in its guide way, a drive unit 120 is provided including forceably extensible and retractable means comprising a double-acting power cylinder 122 and piston 124 pivotally connected by pin 126 to gate opening mechanism 128. Door opening mechanism 128 is reciprocably mounted on track means 130 and is hingedly connected to the door 94 by pin 102 extending transversely across the width of the scraper bowl, with the hydraulic cylinder and piston arrangement thus effecting reciprocating movement of the roller 102.

On actuation of the door opening cylinder and piston 122, 124 by control means 134 leading to the operator's panel, the piston 124 moves forward out of the cylinder, forcing the door opening mechanism 128, the pin 102, and the gate support bracket 104 forward and causing the hinge or pin 96 and gates 92, 94 to move convergingly upwardly, that is, the pivotal supporting connection at 102 moves convergingly with respect to the fixed pivotal connection at 98 whereby the dump gates move rotatingly downwardly about the central pivotal connection 96 which is moving upwardly and forwardly with respect to the fixed connection at 98. On such converging movement of the gates an opening in the bottom dumping floor is formed, permitting bottom dumping of the earth fill materials within the bowl.

A particularly advantageous feature of the dumping doors is the method in which the operator may control the spreading of the earth fill materials within the scraper. The depth to which the material is spread is readily determined by the operator who is able to positively control the angle at which the doors are held in dumping position. By maintaining a uniform tractor speed, the earth fill materials may be spread to the depth desired. Thus the earth fill materials are positively positioned in the location desired and in the depth desired.

The spreader

The invention includes an earth fill spreading device or earth spreader that is actuated by the door closing mechanism. The spreading attachment which is pivotally connected to the rear end of the scraper bowl in the rear of the rearmost dump gate supporting connection 102, spreads the earth fill evenly over the ground as it is dumped, the door opening mechanism raising the spreader device 140 illustrated in FIGS. 6–9 into travelling or storage position as in FIG. 6 when the doors are closed. The spreader device swings or rotates down gravitationally as in FIG. 7 when the doors are opened to an operating or dumping position.

The leveling blade 146 is hingedly supported from a bottom rear portion of the scraper bowl by lugs 200 and 201 being pivotally connected by pin 148. The leveling blade 146 is secured to support lug 201 which in turn is pivotally connected by pin 148 to support bracket lug 200 mounted dependingly from the scraper bottom. The leveling blade extends forwardly from the support lug 201 and has a horizontally positioned rectilinear outer edge 143.

Means for lowering the blade into leveling position is provided and comprises a roller pad 150 which may be secured to the horizontally slidable end of door 94 or as illustrated in FIG. 2 to the rear end of the door actuating mechanism 128. On opening movement of the dump gates, door actuating mechanism 128 and dump gate 94 move forwardly and the roller pad is moved convergingly toward the far end of the other dump gate 92 away from the normal position of roller pad 150 in contact with roller 142. The blade 146 moves gravitationally, rotatingly downwardly about its pivot 148 and into earth spreading position as seen in FIG. 7.

The spreader device includes a roller 142 secured pivotally to the apex 147 of generally triangular leveling blade actuating arms 144 which are secured to the leveling blade for rotation with the blade and its support lug 201 about pin 148.

The roller 142 is secured pivotally to the apex 147 of the blade actuating arm 144. Means for raising the blade into a travelling horizontally extending position comprises the roller pad 150 which is moved rearwardly into rolling bearing engagement with roller 142 upon closing movement of the dump gates moving the roller rearwardly and causing the spreader blade to move pivotally upwardly to a generally horizontal position.

A blade stop plate 149 is provided and is secured to the base of support lug 201 in a rearwardly extending position. As seen in FIG. 7 the stop plate is secured directly to lug 201 and blade 146 is mounted against the stop plate so that when the spreader blade swings down, the blade stop plate rotates upwardly and rearwardly into position against the lower rear end of the scraper bowl so as to limit rearward movement of the spreader blade.

Material retainer

The flexible material retainer mechanism with which the scraper is provided is another advantageous feature. The flexible retainer or panel assembly 171, FIGS. 4 and 5, includes two channel-shaped material retaining portions or sections 172 hingedly secured to the elevator frame 167 by pin 174 and firmly held in normal loading position shown in FIG. 5, that is, parallel to longitudinal upwardly extending sides of the elevator frame 167 by resilient spring means 169. The spring means provided to hold the material retainer channels in position includes springs 176 secured at one end to material retaining channel or section 172 by a spring bracket 178 and secured at the other end to the conveyer frame by spring bracket 180.

The flexible material retainers serve unique dual purposes of resiliently securing or keeping earth fill materials that have been loaded by the vertical elevator from sifting out of the bowl; and of rising and thus serving as a guide way to permit materials cut by the side bits or side cutters 182 to enter the bowl at this position, the forward movement of the scraper device creating sufficient pressure to urge the material retaining channels upwardly, overcoming the pressure of the spring and forcing earth fill materials into the bowl of the scraper. The continuously applied downward pressure of the springs prevents already loaded materials from sifting out of the bowl.

Upwardly of the channel-shaped material retainers, generally rectangular material retaining plates or panels 173 may be advantageously secured rigidly to the sides of the elevator frame 167. This modification is seen in FIG. 1 which illustrates a plate affixed extending generally outwardly from the elevator frame toward the bowl sides to partially close the open front end of the scraper bowl. These rectangular plates, while not essential, are seen to be of particular benefit in assisting the slats of the vertical elevator and the flexible channel-shaped material retainers to retain earth fill materials within the bowl.

Load signal device

A load signal means 40 is provided on an upper portion 39 of the end 38 of the scraper bowl to warn the operator when the scraper bowl is fully loaded, since otherwise the operator would not know when the scraper bowl was fully loaded due to the relatively great height of the dirt in the scraper bowl and the complete manner in which the bowl is filled.

The load signal device 40 is fully illustrated in FIGS. 10 and 11. An L-shaped mounting plate or angle iron is sesured fixedly to an upper portion 39 of the rear end 38 of the scraper bowl. The mounting plate 70 has a rearwardly extending arm 71 extending from the rear end of the scraper bowl with a warning switch 72 mounted thereon.

The warning switch has a depressible signal switch or button 74 and a pair of lead wires 76 connected in conventional fashion to a warning device or light, not shown, the warning device being positioned so as to be readily seen or heard by the tractor operator.

A paddle plate 78 is connected hingedly to the upper portion 39 by a pin 80, with a rearwardly extending actuating arm 82 mounted on the back side 79 of the paddle plate in proximate location to the button 74. Means is provided to prevent the paddle plate from rotating forwardly into the main portion of the scraper bowl and comprises stops 75 rigidly secured to the paddle plate. Spring 86 is positioned directly below the arm 82 in resilient spring supporting relationship to the arm, supporting the arm at its outer extremity and holding it away from the depressible button 74.

As the scraping operation is carried forward, the scraper bowl gradually fills from front to back until the bowl is completely filled. At this point the earth fill materials begin to pile up against a forward face 77 of the paddle plate 78, urging the paddle plate rearwardly and on overcoming the upwardly supporting force of the spring 86, causing the actuating arm 82 to rotate rearwardly and depress button 74. As the button 74 is depressed, an electric circuit leading to a warning device horn, buzzer or light on the operator's panel is closed, permitting a flow of electric current through the wires 76 and thus operating a warning device, not shown.

With conventional scraper devices it is apparent that a warning device, while desirable, would not be absolutely essential since a complete filling of the scraper bowl was unlikely in prior art scrapers. In applicant's novel scraper device this is not the case; because of the manner in which the scraper bowl is completely filled, a signal device is extremely benficial in that it permits the operator to direct his attention to the area in front of the tractor rather than rearwardly to determine how fully the bowl has been loaded.

*Objects accomplished*

Thus, it is seen that a substantially vertical elevator and horizontal conveyer have been provided to more quickly load earth fill materials within the scraper with a minimum of time, expense and power required. The novel combination provided sweeps earth fill materials rearwardly for a more complete bowl loading than has heretofore been possible, thus permitting relatively longer scraper machines with consequent greater stability than have heretofore been known.

A means has been provided for preventing loading stoppages due to the jamming of rocks and other large objects seeking entrance into the bowl, whereby to more efficiently load the bowl.

Novel flexible earth retainer means have been provided whereby to hold earth fill materials in the bowl alongside the narrow vertical elevator.

The unique configuration and positioning of the shorter elevator and conveyer slats has achieved the object of simplicity of design consistent with low power requirements.

A signal means, necessitated by the more complete scraper bowl loading, has been provided to warn the scraper operator of a full load.

Novel means has been provided for bottom dumping whereby earth fill materials are quickly and uniformly unloaded in the area desired and in the depth desired.

In conclusion, it is seen, from the above description of the invention and the enumeration above of some of the results achieved, that the objects have been accomplished in a deceivingly simple and particularly novel manner yielding a scraper machine capable of unusually prompt loading and unloading.

While one specific embodiment of the invention has been described above, this invention should not be limited thereto since many modifications of the invention may be made. It is thus contemplated by the appended claims to cover any such modifications as fall within true spirit and scope of this invention.

The invention is hereby claimed as follows:

1. In an earth scraper including a bowl having a bottom and sides, the improvement comprising a bottom dumping floor and an earth spreader device in combination therewith, said floor comprising at least one set of two upwardly opening bottom dump gates having a pivotal connection therebetween, each of said gates of a set having a central end and a far end, said pivotal connection comprising a hinge connecting the central ends of two dump gates, said connection extending transverse the scraper sides and permitting opening rotation of the far end of said gates about said hinge and convergingly with respect to each other, said pivotal connection permitting a converse closing rotation of said gates divergingly with respect to said moving hinge, said pivotal connection and central gate ends connected thereto being movable upwardly for opening of said gates, a first fixed pivotal supporting connection at the far end of the first of said dump gates, a second horizontally slidable supporting pivotal connection at the far end of the second of said dump gates, means for moving said second supporting connection slidably in track means positioned horizontally along the outer sides of the scraper bowl, said movement being convergingly with respect to said first fixed pivotal connection, whereby the dump gates are moved rotatingly about said central upwardly moving pivotal connection whereby an opening in the bottom dumping floor is formed for bottom dumping of the earth fill materials within the bowl; an earth spreader device pivotally connected to the rear end of the scraper bowl rearwardly adjacent the second horizontally slidable pivotal dump gate supporting connection, said earth spreader comprising a blade stop plate hingedly secured to the scraper rear end by a support arm and being rotatable pivotally upwardly and rearwardly into position against the rear end of said scraper thereby limiting rearward movement of a spreader blade; a spreader blade rigidly secured to the stop plate and extending forwardly therefrom having a generally horizontally positioned rectilinear outer edge; means for moving said support arm and blade about said pivotal connection to effect lowering of said blade from a generally horizontal position to a generally downwardly extending substantially vertical earth spreading and leveling position, said means comprising a roller secured pivotally to the apex of said actuating arm, said roller being positioned for rolling movement reciprocably, longitudinally of said scraper bowl; and means for effecting said reciprocating movement of said roller comprising a roller pad fixedly secured to the horizontally slidable far end of the second dump gate and being engageable with said roller upon rearward movement of the far end of the second dump gate, whereby upon upward opening of said dump gates, said roller pad moves convergingly toward the far end of the other dump gate causing said roller to roll forwardly against said moving roller pad effecting pivotal gravitational lowering of said spreader blade about said pivotal support arm connection, said roller pad upon downwardly closing movement of said dump gates bearing rearwardly against said roller causing it to move rearwardly and moving said spreader blade pivotally upwardly about said pivotal connection to a generally horizontal position.

2. In an earth scraper of the type described including a frame and a bowl having a bottom and sides, the improvement comprising a bottom dumping floor and earth spreader in combination therewith, said floor comprising at least two upwardly opening bottom dump gates having a pivotal connection therebetween, each of said gates having a central end and a far end, said pivotal connection extending transverse the scraper sides and permitting opening rotation of the gates about said pivotal connection, said pivotal connection and the central portion of said gate ends being movable simultaneously upwardly for opening of said gates, a first fixed pivotal supporting connection at the far end of the first of said dump gates, a second horizontally slidable supporting pivotal connection at the far end of the second of said dump gates, means for moving said second supporting connection slidably in track means positioned along the sides of the scraper bowl convergingly toward said first fixed supporting pivotal connection, whereby the dump gates are moved rotatingly about said central upwardly moving pivotal connection, and whereby the far ends of the gates move convergingly together creating an opening in the floor for bottom dumping of the earth fill materials within the bowl; said earth spreader comprising an earth spreading and leveling device, said device comprising a leveling blade pivotally secured to the scraper frame adjacent the lower rear end for rotation of said blade downwardly to a substantially vertical earth spreading position with rotation thereof being about a horizontal axis substantially transverse of said scraper frame, blade stop means rigidly secured to the blade and rearwardly extending therefrom limiting rotation of said blade and being a rear support for said blade in spreading position, bottom dump gate means for automatically actuating gravitational pivoting of said blade about said pivotal connection to effect lowering of said blade from a generally horizontal position to a generally downwardly extending vertical earth spreading and leveling position at such time as the dump gates are open and for moving said spreader blade pivotally upwardly to a traveling position about said pivotal connection at such time as the dump gates are closed.

3. In combination with an earth scraper machine of the type described having a bowl with an upwardly opening pivoting dump gate floor, the improvement comprising an earth spreading and leveling device comprising spaced apart blade actuating arms of generally triangular cross section, said arm having one base blade support side of said triangle attached to a leveling blade and having two other sides extending upwardly from the base side to form an apex at their intersection, blade stop means for delimiting movement of a leveling blade, said leveling blade being of generally rectangular cross section and secured to the base side of said triangular actuating arms and extending forwardly therefrom, the outer extremity of said blade being generally horizontally rectilinear, said actuating arms being pivotally connected to the rear end of the scraper bowl for rotation of said blade and stop means vertically about a horizontal axis substantially transverse of said scraper bowl, means for pivoting said actuating arms and blade about said pivotal connection to effect lowering of said blade from a generally horizontal to a generally downwardly extending vertical earth spreading and leveling position, said means comprising a roller pivotally secured to the apex of said actuating arms, said roller being positioned for rolling movement reciprocably longitudinally of said scraper bowl, and means for effecting said reciprocating movement of said roller, comprising a roller pad fixedly secured to a horizontally slidable dump gate, whereby upon upwardly opening of said dump gate said roller rolls forwardly against said moving roller pad effecting pivotal lowering of said spreader blade about said pivotal connection into spreading position, and whereby upon closing movement of said dump gate said roller pad bears rearwardly against said roller causing it to move rearwardly and causing said spreader blade to move pivotally upwardly to a generally horizontal position about said pivotal connection.

4. In an earth scraper of the type described including a bowl, signal means to notify a scraper operator that the scraper bowl is completely filled comprising an L-shaped paddle plate hingedly connected to an upper portion of the rear end of the scraper bowl, said paddle plate having an upwardly extending paddle arm and a rearwardly extending actuating arm, said rearwardly extending actuating arm being resiliently spring supported at its outer extremity by spring means secured to a rear side of said scraper rear end and being positioned immediately above a depressible signal switch secured to the rear side of the scraper rear end in position immediately subjacent said actuating arm, said switch being connected by a pair of lead wires to signal means, means supporting the upwardly extending paddle arm on its forward side preventing the paddle plate from rotating forwardly into the scraper bowl, said upwardly extending paddle arm being so positioned to act as a spring support to earth fill materials deposited within the bowl until such time as the earth fill material overcomes the upwardly supporting force of the spring means whereby the paddle arm and actuating arm are rotated rearwardly depressing the signal switch and whereby the warning circuit is closed and signal means actuated.

5. In a front loading, bottom dumping earth scraper machine of the type described including a scraper bowl, the improvement comprising the combination therewith of an upwardly extending elevator, a complementary rearwardly extending conveyer and cooperative signal means, said elevator pivotally mounted upon a front end upper portion of the scraper machine and having a forward elevator side facing the front end of the scraper machine and a rear elevator side facing the rear end of the scraper machine, a lower portion of the elevator being positioned in normal loading position above a scraper blade positioned on the front end of the scraper bowl so as to form an earth fill receiving opening therebetween, said elevator comprising upper and lower sprockets mounted on upper and lower shafts positioned transverse the sides of the scraper bowl; upwardly extending continuous chains mounted for rotation on said upper and lower sprockets; spaced apart transversely extending slats mounted upon said continuous chains; drive means for driving said sprockets for normal forward rotation of said slats downwardly on the forward side of said conveyer and upwardly on the rear side of said conveyer including means for reversing said normal slat rotation to cause said slats on the front side of said conveyer to move upwardly, said slats being substantially shorter than the distance between the scraper bowl sides; extensible and retractable means for moving the elevator pivotally about a central axis of the upper shaft, said extensionable and retractible means comprising double acting extensible and retractable hydraulic cylinder and piston means pivotally secured at one end to the frame of the elevator and pivotally secured at its other end to the scraper frame, said extensionable and retractible means resiliently holding the elevator frame in lowered position under pressure, whereby the lower end of said elevator may swing pivotally upwardly about the central axis of the upper shaft on wedging entrance of large rocks between said elevator and said scraper blade, said elevator cooperatively arranged with the rear side of its lower end adjacent said scraper blade whereby earth fill material cut by said scraper blade is swept inwardly and upwardly of said scraper bowl by upwardly moving slats; said signal means comprising a paddle plate hingedly connected to an upper portion of the rear end of the scraper bowl, said paddle plate having an upwardly extending plate and a rearwardly extending actuating arm, said rearwardly extending actuating arm being resiliently spring supported at its outer extremity and being positioned immediately above a depressible warning signal switch secured to the rear side of the scraper rear end and connected by a pair of lead wires to warning signal means, means preventing the plate from rotating forwardly into the scraper bowl, the conveyer pushing earth fill materials rearwardly against the rear end of the scraper bowl until completely filled and then continuing to load earth fill materials against the upwardly extending plate of said signal means urging said plate and actuating arm rearwardly against the resilient spring supporting said actuating arm, whereby the pressure of the earth urged against said plate by the conveyer overcomes the support of said spring and whereby the actuating arm is rotated rearwardly depressingly against said depressible warning signal switch closing an electrical signal circuit.

6. In a scraper machine including the combination of a scraper bowl having a pair of sides, an open front end portion, a closed rear end portion, a pair of side cutters, and a floor having a scraper blade positioned at the front end thereof, the improvement comprising the combination therewith of an upwardly extending rearwardly inclined elevator pivotally secured to the front end of the scraper machine, said elevator having a forwardly facing side and a rearwardly facing side, an upper portion and a lower portion, said elevator comprising: upper and lower sprockets supported by the sides of the scraper bowl; continuous chains mounted around said upper and lower sprockets; spaced apart transversely extending slats mounted upon said continuous chains, said slats being substantially shorter than the distance between the scraper sides; means for driving said sprockets; extensionable and retractable means for raising and lowering the lower portion of the elevator pivotally about a central axis of the upper sprockets, said extensionable and retractable means resiliently holding the lower portion of the elevator in a normal loading position; said extensionable and retractable means enabling the lower portion of the elevator to pivot upwardly about the central axis of said upper sprocket to permit entrance of large objects between said conveyer and said scraper blade; said extensionable and retractable means automatically returning the lower portion of the elevator to normal loading position after entrance of said large objects, said elevator cooperatively arranged with its lower end adjacent said scraper blade whereby earth fill material cut by said scraper blade is swept inwardly and upwardly of said scraper bowl; and resilient earth retaining means positioned sidewardly complementary to said elevator adjacent the ends of the slats to block the lower portion of said open front end and to secure earth fill materials within said scraper bowl; and means for enabling a lower portion of said earth retaining means to be raised by wedging entrance of earth fill materials cut by the scraper machine side cutters into the scraper bowl.

7. In a scraper machine including the combination of a scraper bowl having a pair of sides, an open front end portion, a closed rear end portion, a pair of side cutters, and a floor having a scraper blade positioned at the front end thereof, the improvement comprising the combination therewith of an upwardly extending rearwardly inclined elevator pivotally secured to the front end of the scraper machine, said elevator having a forwardly facing side and a rearwardly facing side, an upper portion and a lower portion, said elevator comprising: upper and lower sprockets mounted on rotatable shafts positioned transverse the sides of the scraper bowl; continuous chains mounted around said upper and lower sprockets; spaced apart transversely extending slats mounted upon said continuous chains, said slats being substantially shorter than the distance between the scraper sides; means for driving said sprockets; means for raising and lowering the lower portion of the elevator pivotally about a central axis of said upper sprocket, said means resiliently holding the lower portion of the elevator in a normal loading position, said means enabling the lower portion of the elevator to pivot upwardly about the central axis of said upper sprockets to permit entrance of large objects between said conveyer and said scraper blade, and said means returning the lower portion of the elevator to normal loading position after entrance of said large objects, said elevator cooperatively arranged with its lower end adjacent said scraper blade whereby earth fill material cut by said scraper blade is swept inwardly and upwardly of said scraper bowl; and a pair of spring loaded resilient earth retaining devices acting cooperatively with said elevator to retain earth previously loaded within the bowl, said retaining devices comprising generally rectangular flat plate web portion having turned down flange portions, said flange portions being positioned extending downwardly of said web and having two ends, the retaining device being pivotally connected at its upper end to a lateral extension of the elevator frame, spring means resiliently securing said retaining devices incliningly and generally coplanar with the elevator with the lowermost ends of said retaining devices above and spaced apart from the scraper blade forming an opening therebetween, said spring means permitting rotation of said web portions in a vertical plane upwardly about said upper pivotal connection, said pivotal connection forming a horizontal axis of rotation transverse the scraper sides whereby said retaining device resiliently secures earth fill material within the scraper bowl while permitting wedging entrance of rocks and earth fill materials cut by said side cutters into the widened opening between the scraper blade and the lower end of the retaining device; and whereby said retaining device is urged by said spring means rotatingly downwardly about the upper pivotal connection immediately after said wedging entrance of materials.

8. In a scraper machine including the combination of a scraper bowl having a pair of sides, an open front end portion, a rear wall and a floor with a blade positioned adjacent the front end portion of the scraper bowl, the combination comprising an elevator having a lower end disposed adjacent said blade and an upper raised end; material lifting means on said elevator disposed toward the interior of said bowl; power means for raising said lifting means to lift earth and the like scraped up by said blade; and a spreader conveyer means having a front end disposed adjacent the upper raised end of said elevator and a rear end disposed relatively adjacent said bowl rear wall, said spreader conveyer means having spreading means thereon disposed downwardly into said bowl and engageable with earth and the like lifted by said elevator, said power means driving said conveyer spreading means from the front to the rear end of said conveyer to spread and distribute earth and the like.

9. The combination set forth in claim 8 wherein said lifting means extends transversely of the machine a lesser distance than the distance between the bowl sides and wherein the conveyer spreading means includes means for spreading earth and the like transversely of the machine.

10. The combination set forth in claim 9 wherein the spreading means comprises substantially V-shaped means driven apex first toward the rear of the bowl.

11. In a scraper machine including the combination of a scraper bowl having a pair of sides, an open front end portion, a rear wall and a floor with a blade disposed at the front end adjacent said open portion, the combination comprising a lifting elevator having a lower portion disposed adjacent said blade and an upper raised portion, said elevator being of lesser width than the space between said bowl side walls and including means for raising earth and the like scraped up by said blade, and spreader conveyer means having a front portion adjacent the upper portion of said elevator and a rear portion disposed relatively adjacent the rear of said bowl, said spreader conveyer means having means for spreading earth and the like toward a rear end portion of said bowl and also toward the sides of said bowl.

12. The combination set forth in claim 11 wherein the spreader conveyer comprises V-shaped means driven apex first toward the rear of said bowl.

13. In a scraper machine including the combination of a scraper bowl having a pair of sides, a front end portion, a rear end portion and a floor having a scraper blade positioned at the front end thereof, the improvement comprising the combination therewith of an upwardly extending rearwardly inclined elevator pivotally secured to the front end of the scraper machine, said elevator having a forwardly facing side and a rearwardly facing side, an upper portion and a lower portion, said elevator comprising upper and lower sprockets mounted on upper and lower shafts positioned transversely of the sides of the scraper bowl, continuous chains mounted around said upper and lower sprockets, spaced apart transversely extending elevator slats mounted on said continuous chains, said elevator slats being susbtantially shorter than the distance between the scraper side, means for driving said sprockets, means for raising and lowering the lower portion of the elevator relative to said blade; said means, after lowering the lower portion of the elevator, acting to resiliently hold the lower portion of the elevator in a normally loading position, but enabling the lower portion of the elevator to raise upwardly relative to said blade to enable the entrance of large objects between said conveyor and said scraper blade, and said means automatically returning the lower portion of the elevator to the normal loading position after entrance of said large objects, said elevator including a frame to which generally rectangular material retaining plates are fixedly secured, said plates extending generally outwardly to the sides of the scraper bowl to partially close the open front end of the scraper bowl, whereby earth fill material elevated by said elevator is retained within said bowl.

14. A front loading, bottom dumping earth scraper machine including the combination of a scraper bowl having a pair of sides, an open front end portion, closed rear end portion, and a floor supported by the sides and having a scraper blade positioned at the front end thereof, the improvement comprising the combination of: an upwardly extending elevator and a complementary rearwardly extending conveyor, said elevator being pivotally secured to the front end of the scraper machine and said elevator having a forwardly facing side and a rearwardly facing side, an upper portion and a lower portion, said elevator comprising upper and lower sprockets mounted on transversely extending upper and lower shafts rotatably mounted on the side of the scraper bowl, continuous chains mounted for rotation on the upper and lower sprocket, spaced apart transversely extending slats mounted upon said continuous chains; drive means for driving said sprockets; positioning means for raising and lowering the lower portion of the elevator pivotally about a central axis of said upper shaft, said positioning means resiliently holding the lower portion of the elevator in a normal loading position, said positioning means enabling the lower portion of the elevator to pivot upwardly about the central axis of the upper shaft to enable wedging entrance of large objects between said conveyor and said scraper blade, and said positioning means lowering the lower portion of the elevator to normal loading position after entrance of said large objects, said elevator being cooperatively arranged with its lower end adjacent said scraper blade whereby earth fill material cut by said scraper blade is swept inwardly and upwardly of said scraper bowl; and said conveyor being positioned rearwardly of said elevator and cooperating therewith to deposit earth fill material elevated by said elevator into the side and rearmost inner portion of the scraper bowl, said conveyor being fixedly secured to the scraper bowl and maintained in position substantially parallel to the scraper bowl floor, said conveyor comprising forward and rearward sprockets mounted on transversely extending and rotatable forward and rearward shafts positioned above and between an upper portion of said scraper sides, said forward sprocket being positioned rearwardly of the upper sprockets of the elevator and adjacent to the front upper portion of the scraper sides; continuous conveyor chains mounted for rotation around said forward and rearward sprockets, and spaced apart angle irons mounted upon said continuous conveyor chains in a transversely extending relationship with said conveyor chains, said angle irons having leading central portions and trailing end portions, said leading central portions comprising the vertex of the longitudinally V-shaped angle irons, a lower side of said conveyor having said leading edges extending rearwardly to sweep material raised into the scraper bowl by the elevator rearwardly and sidewardly when loading the scraper bowl, said drive means being connected for driving said conveyor sprockets for normal rotation rearwardly of said angle irons when positioned on the lower side of said conveyor, said drive means being reversible for reverse rotation of said conveyor contemporaneously with reverse rotation of said elevator for moving earth fill materials within the bowl forwardly and downwardly for unloading the bowl.

15. In an earth scraper of the type described including a scraper bowl having a bottom side, the improvement comprising: a bottom dumping floor, said floor comprising at least one set of two bottom dump gates having a pivotal central connection therebetween, said pivotal connection comprising a hinge connecting central ends of said dump gates, said hinge extending transversely of the scraper bowl and enabling opening rotation of a far end of said gates about said hinge and convergingly with respect to each other, a first fixed pivotal connection at the far end of the first of said dump gates; a second horizontally slidable supporting connection at the far end of the second of said dump gates; means for moving said second supporting connections sildably in track means positioned along lower sides of the scraper bowl for converging movement toward said first support connection, whereby the dump gates are moved simultaneously rotatingly about said central connection, said central pivotal connection moving simultaneously upwardly, the far end of the dump gates convergingly sliding toward the first of said dump gates whereby an opening in the floor is formed for bottom dumping of the earth fill materials within the bowl.

16. The earth scraper of claim 15 wherein said floor comprises two sets of bottom dump gates, the first supporting connection at the far end of the first of said dump gates in a first set being positioned rearwardly adjacent the transversely extending scraper blade and forming a continuation thereof, said second set of dump gates being positioned with its first supporting connection fixed rearwardly adjacent the far end of the second dump gate in said first set, the sets of gates being supported in position with their pivotal central connection inclining upwardly from their far ends, whereby upon opening actuation of said means for moving said second slidable connection said doors fold upwardly and forwardly about the central hinge connection forming two bottom openings rearwardly respectively of the first and second sets of gates.

17. In an earth scraper machine, the combination comprising a bowl for carrying earth and the like and having an openable floor for dumping earth and the like carried in said bowl, an earth spreading and leveling blade pivoted at the bottom rear of said bowl and pivotable between the substantially horizontal traveling position and a substantially vertical earth-spreading position, and common means for opening and closing said floor and pivoting said blade, said common means including a power operator for said floor, lever means operatively connected to said spreader blade, and means on said power operator engageable with said lever means.

18. A machine comprising: a body means for holding material, said body means including a rearward end portion and a forward end portion with a blade supported by the forward end portion of the body means; and a material engaging assembly supported by said body means with a lower end portion of said material engaging assembly disposed adjacent to said blade, said material engaging assembly including an upwardly extending first section for pushing material upwardly away from said blade and a rearwardly extending second section positioned adjacent to an upper portion of said first section and at an obtuse angle to said first section for pushing material moved upwardly by said first section toward the rearward end portion of said body means.

19. A machine as set forth in claim 18 wherein: said material engaging assembly is reversible to move material out of said body means by reversing a direction of operation of said second section to push material toward the forward end portion of said body means and by reversing a direction of operation of said first section to move material downwardly toward said blade.

20. A machine as set forth in claim 18 wherein: said first section of said material engaging assembly is movable relative to said blade, said first section being movable outwardly away from said blade from a normal loading position to a bypass position to enable relatively large pieces of material to move between the lower end portion of said material engaging assembly and said blade, and said first section being movable inwardly toward said blade from the normal loading position to a material retaining position in which the lower end portion of said material engaging assembly is positioned in engagement with said body means.

21. A vehicle for transporting materials including: a plurality of upwardly extending sidewalls; a basewall interconnecting said sidewalls to form a receptacle for holding materials to be transported, said basewall including an aperture means through which materials pass downwardly when emptying the vehicle; and first and second panels, said first panel being pivotally connected at a first end portion to said side walls and said first panel being pivotally connected to said second panel at a second end portion of said first panel, said first and second panels being movable from a first position closing said aperture means with inner surfaces of said first and second panels positioned for supporting engagement with material to a second position in which said inner surfaces are positioned at an acute angle relative to each other and said aperture means is open to facilitate the removal of materials from the vehicle.

22. A vehicle as set forth in claim 21 wherein: said inner surfaces of said first and second panels are located at an obtuse angle relative to each other when said first and second panels are in said first position to facilitate movement of said first and second panels from said first position to said second position.

23. A vehicle as set forth in claim 21 further including: a blade pivotally supported by said receptacle adjacent to a rearward edge of said aperture means for spreading and leveling material emptied through said aperture means as the vehicle is moved forwardly; and retaining means for holding said blade storage position when said first and second panels are in said first position and said blade being released by said retaining means for movement from said storage position to an operating position extending downwardly from said receptacle by movement of said panels from said first position to said second position.

24. A vehicle as set forth in claim 21 further including: a track supported by said sidewalls and track engaging means connected to an end portion of at least one of said first and second panels for engaging said track to guide the movement of said first and second panels from said first position to said second position.

25. A machine comprising: a body means for holding material, said body means including first and second upwardly extending sidewalls with a blade positioned intermediate said sidewalls; a material engaging means supported by said body means intermediate said sidewalls for pushing material upwardly away from said blade; first and second upwardly extending panel means mounted intermediate said sidewalls for retaining material in said body means, said first panel means being positioned between said material engaging means and said first sidewall with a lower end section of said first panel means positioned adjacent to said blade, said second panel means being positioned between said material engaging means and said second sidewall with a lower end section of said second panel means positioned adjacent to said blade, whereby said panel means block materials from moving out of said body means between said sidewalls and said material engaging means.

26. A machine as set forth in claim 25 wherein: said material engaging means is mounted for movement outwardly relative to said blade from a normal loading position to a bypass position to enable relatively large pieces of material to move between a lower end portion of said material engaging means and said blade, said first and second panel means being connected to said material engaging means and moved outwardly relative to said blade contemporaneously with the movement of said material engaging means from said normal loading position to said bypass position to facilitate movement of relatively large pieces of material between said blade and said panel means when said body means is being loaded with material.

27. A machine as set forth in claim 25 wherein: said first and second panel means have main body sections connected to the lower end sections of said first and second panel means with spring means connected to said lower end sections whereby said lower end sections can move outwardly relative to said blade independently of the main body sections of said first and second panel means to enable relatively large pieces of material to move between said blade and the lower end section of said first and second panel means when said body means is being loaded with material.

28. A machine comprising: a body means for holding material, said body means including a rearward end portion and a forward end portion with a blade supported by the forward end portion of the body means; an elevator assembly supported by said body means with a lower end portion of said elevator assembly disposed adjacent to said blade, said elevator assembly including first material engaging means for pushing material upwardly from said blade; and conveyor means supported by said body means adjacent to an upper portion of said elevator assembly, said conveyor means including second material engaging means for pushing material away from said elevator assembly toward the rearward end portion of said body means.

29. A machine as set forth in claim 28 wherein: said second material engaging means is moved by said conveyor means in a direction parallel to a longitudinal axis of said conveyor means, and said second material engaging means has a material engaging surface positioned at an acute angle relative to the central axis of said conveyor means to spread the material in said body means outwardly from the central axis of said conveyor means.

30. A machine as set forth in claim 28 wherein: said elevator assembly is mounted for pivotal movement relative to said body means, said elevator assembly being pivotal outwardly away from said blade from a normal loading position to a bypass position to enable relatively large pieces of material to move between said elevator assembly and said blade when said body means is being loaded with material, and said elevator assembly being pivotal inwardly toward said blade from said normal loading position to a material blocking position in which said elevator assembly is positioned in engagement with said body means to retain the loaded material in said body means.

31. An assembly as set forth in claim 30 wherein: said body means includes first and second side walls and said elevator assembly is positioned intermediate said first and second side walls, said elevator assembly including a first panel mounted adjacent to said first side wall and a first end portion of said first material engaging means to block material from moving between said first side wall and said first end portion of said first material engaging means when said elevator assembly is in said material blocking position, and wherein said elevator assembly further includes a second panel mounted adjacent to said second side wall and said first end portion of said first material engaging means to block material from moving between said second side wall and said first end portion of said first material engaging means when said elevator assembly is in said material blocking position.

32. A machine comprising: a body means for holding material, said body means including a rearward end portion and a forward end portion with a blade supported by the forward end portion of the body means; a material engaging assembly supported by said body means with a lower end portion of said material engaging assembly disposed adjacent to said blade, said material engaging assembly including an upwardly extending first section for pushing material upwardly away from said blade and a rearwardly extending second section positioned at an obtuse angle to said first section for pushing material moved upwardly by said first section toward the rearward end portion of said body means; and signal means mounted on the rearward end portion of said body means for signaling when a predetermined volume of material has been loaded into said body means.

33. A machine comprising: a body means for holding material, said body means including a rearward end portion and a forward end portion formed by a plurality of side walls interconnected by a base means with a blade supported by the forward end portion of the body means, said base means including first and second panel members interconnected by a hinge; and a material engaging assembly supported by said body means with a lower end portion of said material engaging assembly disposed adjacent to said base, said material engaging assembly including an upwardly extending first section for pushing material away from said blade and a rearwardly extending second section positioned at an obtuse angle to said first section for pushing material moved upwardly by said first section toward the rearward end portion of said body means, said first and second panel members being movable upwardly relative to said side wall for pivoting about a central axis of said hinge and converging toward each other to move from a material supporting position to a dumping position in which an aperture means in said base means is opened for emptying material from said body means.

34. A machine as set forth in claim 33 wherein: said panel members slope outwardly and downwardly relative to each other when they are in the material supporting position to facilitate movement of said panel member from said material supporting position to said dumping position.

35. A machine as set forth in claim 33 further including: said blade is mounted on said body means for spreading and leveling material dumped through the aperture means in said base means; and said body means includes retaining means for holding said blade in a storage position, said retaining means being operated by the upward movement of said first and second panel members from said material supporting position to said material dumping position to release said blade for movement relative to said body means from a storage position to a downwardly extending operating position.

36. A vehicle for transporting materials including: a plurality of upwardly extending sidewalls; a basewall interconnecting said sidewalls to form a receptacle for holding materials to be transported, said basewall including an aperture means through which materials pass downwardly when emptying the vehicle; and first and second panels, said first panel being pivotally connected at a first end portion to said sidewalls and said first panel being pivotally connected to said second panel at a second end portion of said first panel, said first and second panels being movable from a first position closing said aperture means with inner surfaces of said first and second panels positioned for supporting engagement with material to a second position in which said inner surfaces are positioned at an acute angle relative to each other and said aperture means is open to facilitate the removal of materials from the vehicle; and signal means mounted on a side wall of said receptacle for signaling when a predetermined volume of material has been loaded into said body means.

37. A vehicle for transporting materials including: a body means for holding the materials, said body means defining an aperture means to enable materials to be emptied downwardly from the vehicle; first and second doors supported by said body means, said first door being pivotally connected to said body means by a first connector assembly at a first end portion of said first door and said second door being pivotally connected to a second end portion of said first door by a second connector assembly, said first and second doors being movable from a first position in which said aperture means is blocked to a second position in which said aperture means is open by pivoting said first door upwardly about a central axis of said first connector assembly and pivoting said second door upwardly and toward said first door about a central axis of said second connector assembly.

38. A vehicle as set forth in claim 37 further including: a track supported by said body means and a track engaging means mounted adjacent to an end portion of said second door for engagement with said track to guide the movement of said doors from said first position to said second position.

39. A machine comprising: body means for holding material, said body means including a rearward end portion and a forward end portion with a blade supported by the forward end portion of said body means, said body means further including a forward door assembly and a rearward door assembly forming at least a partial bottom for said body means, said door assemblies being movable from a closed position supporting material in said body means to an open position to empty material from said body means; an elevator assembly supported by said body means with a lower end portion of said elevator assembly disposed adjacent to said blade, said elevator assembly including first material engaging means for pushing material upwardly from said blade; and conveyor means supported by said body means, said conveyor means including second material engaging means for pushing material positioned above said forward door assembly by said elevator assembly to a position above said rearward door assembly to facilitate loading and unloading said body means.

References Cited

UNITED STATES PATENTS

| | | | |
|---|---|---|---|
| 1,225,383 | 2/1918 | Burris | 298—34 |
| 1,371,152 | 3/1921 | Ells | 298—30 |
| 2,089,539 | 8/1937 | Cox | 37—126 |
| 2,125,558 | 8/1938 | Grant | 37—126 |
| 2,154,503 | 4/1939 | French et al. | 37—126 |
| 2,307,933 | 1/1943 | Le Bleu | 37—126 |
| 2,464,098 | 3/1949 | Pittlick | 37—8 |
| 2,511,246 | 6/1950 | Chamberlin | 214—250 X |
| 2,546,907 | 3/1951 | Sherwood | 37—8 X |
| 2,791,041 | 5/1957 | Hancock | 37—126 X |
| 2,984,022 | 5/1961 | Johnson | 37—126 X |
| 2,988,832 | 6/1961 | Hancock et al. | 37—129 |
| 3,143,814 | 8/1964 | Brinkmeyer et al. | 37—8 |
| 3,170,254 | 2/1965 | Martin | 37—124 X |
| 3,210,868 | 10/1965 | Liess | 37—126 X |

OTHER REFERENCES

John Deere 400 Elevating Scraper Operator's Manual OM-U127654, received in Scientific Library Nov. 13, 1961.

ABRAHAM G. STONE, *Primary Examiner.*

R. L. HOLLISTER, *Assistant Examiner.*